(12) United States Patent
Gontermann et al.

(10) Patent No.: US 10,033,320 B2
(45) Date of Patent: Jul. 24, 2018

(54) METHOD FOR CONTROLLING THE MOTOR OF A SYNCHRONOUS RELUCTANCE MOTOR FOR A PUMP AND PUMP COMPRISING A SYNCHRONOUS RELUCTANCE MOTOR

(71) Applicant: KSB Aktiengesellschaft, Frankenthal (DE)

(72) Inventors: Daniel Gontermann, Frankenthal (DE); Jochen Schaab, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 15/500,347

(22) PCT Filed: Jul. 29, 2015

(86) PCT No.: PCT/EP2015/067380
§ 371 (c)(1),
(2) Date: Jan. 30, 2017

(87) PCT Pub. No.: WO2016/016304
PCT Pub. Date: Feb. 4, 2016

(65) Prior Publication Data
US 2017/0214352 A1  Jul. 27, 2017

(30) Foreign Application Priority Data
Jul. 30, 2014 (DE) .................. 10 2014 214 952

(51) Int. Cl.
*H02P 27/00* (2006.01)
*H02P 25/092* (2016.01)
(Continued)

(52) U.S. Cl.
CPC ............. *H02P 25/092* (2016.02); *F04D 1/00* (2013.01); *F04D 13/06* (2013.01);
(Continued)

(58) Field of Classification Search
CPC .... H02P 27/04; H02P 1/00; H02P 6/00; H02P 21/00; H02P 41/00; H02P 41/02;
(Continued)

(56) References Cited

U.S. PATENT DOCUMENTS 3,482,157 A   12/1969  Borden et al.
8,174,222 B2 *  5/2012  Patel .................. B60K 1/02
                                                318/400.01
(Continued)

FOREIGN PATENT DOCUMENTS

DE   18 06 838 C3   11/1975
DE   29 39 090 A1   4/1981
(Continued)

OTHER PUBLICATIONS

International Search Report (PCT/ISA/210) issued in PCT Application No. PCT/EP2015/067380 dated Oct. 21, 2015 with English translation (five pages).

(Continued)

Primary Examiner — Antony M Paul
(74) Attorney, Agent, or Firm — Crowell & Moring LLP

(57) ABSTRACT

A method and apparatus for controlling the motor of a synchronous reluctance motor for a pump, in particular a centrifugal pump, are provided. The motor includes a variable-frequency drive which controls the synchronous reluctance motor in a terminal volts/hertz operation. The pump, in particular a centrifugal pump, includes at least one synchronous reluctance motor and a variable-frequency drive for a motor control, the variable-frequency drive being a terminal volts/hertz variable-frequency drive.

12 Claims, 3 Drawing Sheets

(51) Int. Cl.
*H02P 25/089* (2016.01)
*H02P 27/08* (2006.01)
*F04D 1/00* (2006.01)
*F04D 13/06* (2006.01)
*F04D 15/00* (2006.01)

(52) U.S. Cl.
CPC ........ *F04D 15/0066* (2013.01); *H02P 25/089* (2016.02); *H02P 27/08* (2013.01)

(58) Field of Classification Search
CPC .... H02P 25/08; H02P 1/46; H02P 3/18; H02P 27/00; H02P 23/00; F04B 1/00; F04B 49/10; F04B 49/06; F04B 49/065; F04D 15/0066; F04D 15/0088; F04D 15/02; F04D 15/0236; G05B 15/02
USPC .......... 417/1, 15, 199.1, 237, 294, 321, 409, 417/423.3; 318/400.01, 700, 701, 721, 318/799, 801, 254.1, 400.3; 310/12.18, 310/49.43, 106
See application file for complete search history.

(56) References Cited

U.S. PATENT DOCUMENTS

| | | | |
|---|---|---|---|
| 8,664,903 B2* | 3/2014 | Northup | H02P 23/08 318/400.02 |
| 9,148,083 B2* | 9/2015 | Olsson | H02P 23/0077 |
| 9,371,829 B2* | 6/2016 | Koehl | F04D 15/0088 |
| 9,404,500 B2* | 8/2016 | Stiles, Jr. | F04D 15/0066 |
| 9,410,552 B2* | 8/2016 | Pierson | F04D 25/08 |
| 9,777,733 B2* | 10/2017 | Stiles, Jr. | F04D 15/0066 |
| 2006/0122732 A1* | 6/2006 | Shinomoto | H02P 6/182 700/275 |
| 2007/0071610 A1* | 3/2007 | Holzemer | F04B 49/065 417/44.1 |
| 2012/0139464 A1* | 6/2012 | Filipeti | H02K 1/246 318/400.34 |
| 2013/0251540 A1 | 9/2013 | Paulus et al. | |

FOREIGN PATENT DOCUMENTS

| | | |
|---|---|---|
| DE | 41 13 068 A1 | 11/1992 |
| DE | 103 43 460 A1 | 4/2004 |
| DE | 20 2005 001 746 U1 | 12/2005 |
| DE | 10 2011 086 572 A1 | 5/2012 |
| DE | 10 2010 062 722 A1 | 6/2012 |
| EP | 0 812 052 A1 | 12/1997 |
| WO | WO 2005/050021 A1 | 6/2005 |

OTHER PUBLICATIONS

German-language Written Opinion (PCT/ISA/237) issued in PCT Application No. PCT/EP2015/067380 dated Oct. 21, 2015 (seven pages).
German Office Action issued in counterpart German Application No. 10 2014 214 952.5 dated Apr. 29, 2015 (nine pages).
Brosch, Moderne Stromrichterantriebe, Würzburg: Verlag Vogel 2002. ISBN 3-8023-1887-0. Seite 172 bis 216, pp. 172-173 and pp. 209-216 including partial English-translation (fifteen (15) pages).

* cited by examiner

METHOD FOR CONTROLLING THE MOTOR OF A SYNCHRONOUS RELUCTANCE MOTOR FOR A PUMP AND PUMP COMPRISING A SYNCHRONOUS RELUCTANCE MOTOR

CROSS REFERENCE TO RELATED APPLICATIONS

This application is a National Stage PCT International Application No. PCT/EP2015/067380, filed Jul. 29, 2015, which claims priority under 35 U.S.C. § 119 from German Patent Application No. 10 2014 214 952.5, filed Jul. 30, 2014, the entire disclosures of which are herein expressly incorporated by reference.

BACKGROUND AND SUMMARY OF THE INVENTION

The invention relates to a method for controlling a synchronous reluctance motor for a pump, in particular a centrifugal pump, having a variable-frequency converter. In addition, the invention relates to a pump for carrying out the method.

In order to operate synchronous reluctance motors in a stable fashion, variable-frequency converters which operate with a vector-oriented regulating system are known. It is characteristic of the combination of the motor and power electronics that the motor has a rotor with a flow barrier section, and the torque is produced by the so-called reluctance force on the basis of the anisotropy of the magnetic resistance along the circumference.

With such motor designs, no slip occurs during the operation of the motor, but there is a load-dependent pole wheel angle which must not exceed a specific maximum, since otherwise there is the risk of the motor falling out of step and coming to a stationary state.

In order to perform energy-optimum regulation, the flow-forming and torque-forming components of the current are therefore closed-loop controlled separately from one another by the converter, specifically as a function of the position of the rotor. The position can be determined, on the one hand with sensors or alternatively without sensors on the basis of various methods, such as, for example, the inform method according to Schrödel, the injection method according to REEL or according to the arbitrary injection method of the TU Munich, Kennel.

Although the specified methods dispense with the use of sensors for measuring the rotor position and therefore reduce the susceptibility of the system to faults, this procedure requires complex analysis of the measurement variables. In order to measure the rotor position by using the converter, at least two current measurements are necessary at the output of the converter in order to determine the current motor position on the basis of the determined current values. Furthermore, the converter requires a high level of computing power for model formation. For this purpose, the hardware equipment of the converter generally includes a digital signal processor (DSP).

However, the use of such DSPs is expensive and greatly increases the costs for the control of the motor and for the end application, for example a pump.

The concept of the present invention is then to significantly reduce the expenditure in the converter for actuating a synchronous reluctance motor for a pump.

A method for controlling a synchronous reluctance motor for a pump, in particular a centrifugal pump, using a variable-frequency converter is proposed. According to the invention, the synchronous reluctance motor is controlled by the variable-frequency converter in the volts/hertz operation. The motor is consequently no longer closed-loop controlled as a function of the current variables as before but instead merely open-loop controlled, in particular by an open control circuit. By virtue of the volts/hertz control of the synchronous reluctance motor, the previously necessary current measurement and the associated calculation of the motor model can be eliminated. It is possible to dispense with the use of high-quality DSPs and install a more cost-effective alternative using a converter.

For optimum control it is appropriate to adapt the ratio of the voltage and frequency in order to optimize the magnetization of the synchronous reluctance machine with respect to high energy efficiency to predictable load behavior. Accordingly, the characteristic curve which is necessary for the volts/hertz operation is produced as a function of the use of the pump, in order to achieve a most energy efficient and effective actuation of the synchronous reluctance machine.

Ideally, the volts/hertz ratio has a static-quadratic relationship, specifically in such a way that the overcoming of the start-up torque is ensured, and no energy-costly over-magnetization of the motor of the synchronous reluctance machine is caused at low rotational speeds. A corresponding ratio is appropriate, in particular, when the use of a pump is distinguished by a low dynamic, in particular in the case of applications which are distinguished merely by small changes in the torque within short time periods. In this case, the ratio of the torque demand and the rotational speed is subject to a quadratic relationship, for which reason a corresponding relationship can also be defined for the volts/hertz ratio of the converter.

In one preferred refinement of the invention, the setpoint rotational speed for the volts/hertz variable-frequency converter is determined as a function of the actual rotational speed of the motor and/or of a process variable which is closed-loop controlled indirectly by the rotational speed of the motor, for the use of the pump. The setpoint rotational speed serves as a prescription for the volts/hertz variable-frequency converter which determines the suitable volts/hertz ratio as a function of the setpoint rotational speed. The corresponding pulse-width-modulated voltage pulses for actuating the inverter are generated in the PWM modulator from the setpoint frequency and the voltage value.

The stability of the operation of the motor, in particular in the case of rapid load changes, is considerably reduced by the volts/hertz control of the synchronous reluctance motor, and there is the risk of the rotor falling out of step owing to the maximum pole wheel angle being exceeded. The motor falling out of step becomes apparent through an anomaly of the rotational speed of the motor or a process variable of the pump which is closed-loop controlled indirectly by the rotational speed of the motor, for example the output pressure. Therefore, in the event of the rotor falling out of step, there is the possibility of detecting this by the change in the process variable which is closed-loop controlled indirectly by the rotational speed of the converter, and of resuming the regular operation of the motor by a restart from the stationary state. In this context, the actuation of the synchronous reluctance motor is suspended until a stationary state of the motor is ensured.

In the event of the closed-loop controlled indirectly process variable is a measured pressure, the differential pressure is preferably measured, in particular between the outlet pressure and the suction pressure of the pump. The pressure is ideally measured at the pressure connector of the pump and/or in a pressure line near to the pump and/or at the index circuit of a heating system in which the pump is used.

In addition to the method according to the invention, the present invention also relates to a pump, in particular a centrifugal pump, having at least one synchronous reluctance motor and a variable-frequency converter for controlling the motor. According to the invention, the variable-frequency converter which is used for the pump is a volts/hertz variable-frequency converter. Instead of the use of a high-quality DSP for performing closed-loop control of a synchronous reluctance motor, instead a more cost-effective volts/hertz variable-frequency converter is used which merely controls the synchronous reluctance motor. The advantages and properties of the pump according to the invention clearly correspond to those of the method according to the invention, for which reason at this point a repeated description will not be given.

The volts/hertz variable-frequency converter which is used can be integrated here internally into the pump or connected thereto as an external volts/hertz variable-frequency converter. For example, the pump may be provided with a differential pressure generator or a communication device for communication with an external differential pressure generator. An evaluation unit can generate a corresponding setpoint rotational speed for the volts/hertz variable-frequency converter of the pump as a function of the detected differential pressure.

Furthermore, the invention is directed to the use of a volts/hertz variable-frequency converter for actuating a synchronous reluctance motor, preferably a synchronous reluctance machine for driving a pump, in particular a pump according to the present invention.

The invention also relates to the use of a pump according to the present invention as a heating circulation pump and/or service water circulation pump and/or wet runner. The pump according to the invention is generally used in applications which are distinguished by a low dynamic of the load behavior and additionally merely require a low start-up torque.

In particular in the heating/cooling applications, a brief interruption in operation owing to the relatively slow changes in temperature is not critical. Therefore, the motor operation which is less stable with the simplified solution compared to the conventional actuation of a synchronous reluctance motor in pumps can be accepted without serious restrictions. The solution according to the present invention therefore becomes more favorable.

Other objects, advantages and novel features of the present invention will become apparent from the following detailed description of one or more preferred embodiments when considered in conjunction with the accompanying drawings.

DETAILED DESCRIPTION

Figure 1:
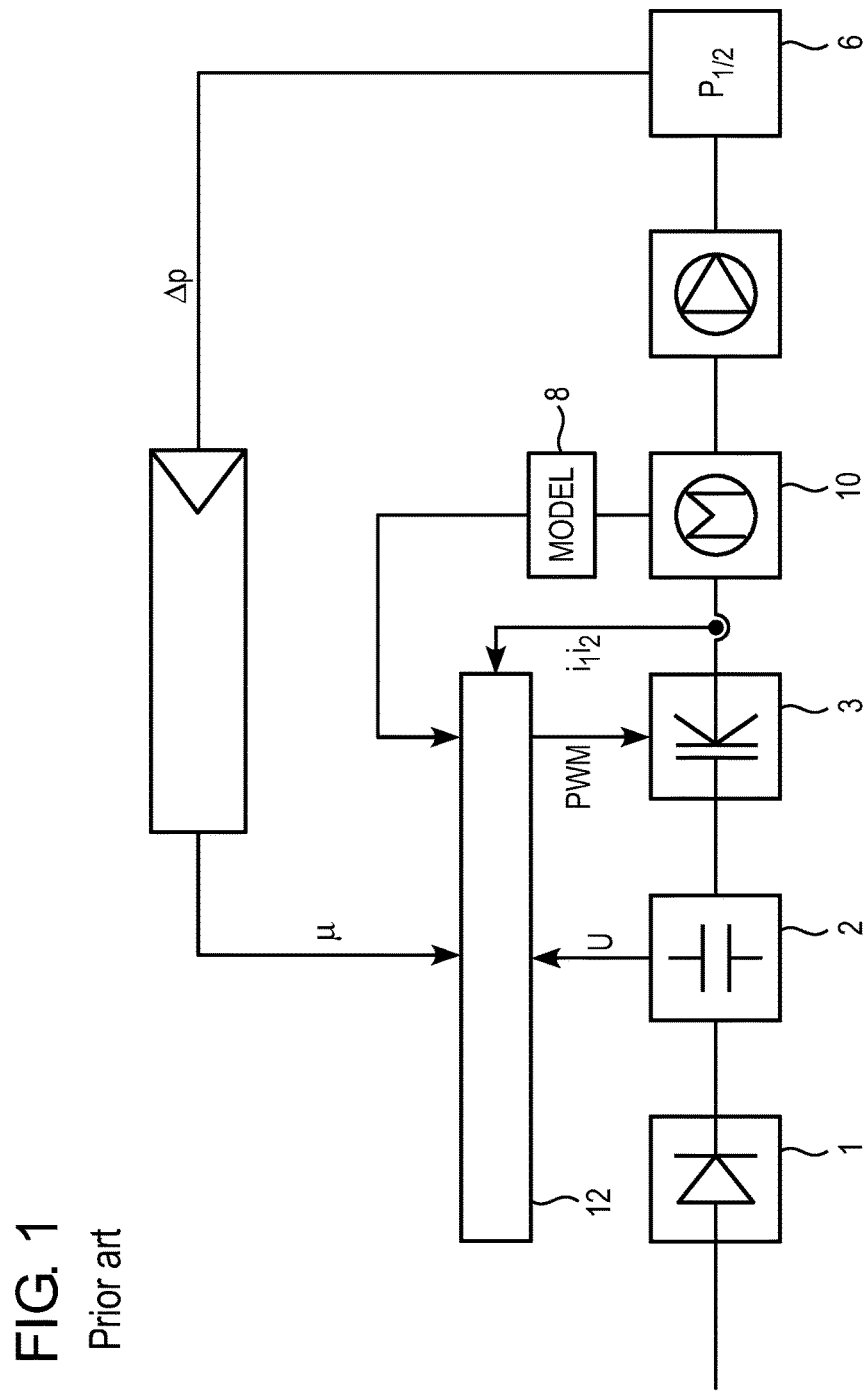
FIG. 1 shows a block diagram of a closed-loop motor control system for a synchronous reluctance motor for a pump according to the prior art.

FIG. 1 shows a block diagram of a conventional closed-loop motor control system for a synchronous reluctance motor 10 for stable operation according to the prior art. The alternating voltage which is applied to the synchronous reluctance motor 10 is rectified in block 1 and smoothed by means of the capacitor 2. The DSP 12 of the variable-frequency converter receives, as input variables, the rectified voltage U and the setpoint rotational speed η which is made available by the block 7 and is determined in the block 7 on the basis of the measured differential pressure Δp. The differential pressure Δp is measured by the differential pressure generator 6.

Furthermore, DSP 12 receives, as an input variable, two measured current components $i_1$, $i_2$ which are measured at the output of the converter, i.e. at the input of the synchronous reluctance motor 10. The position of the rotor can be calculated without a sensor at the DSP 12 from the measured current variables $i_1$, $i_2$. However, this requires the motor model 8 as a further input variable.

The DPS 12 transmits the closed-loop controlled PWM signal as an output signal to the inverter 3 of the synchronous reluctance motor 10, wherein the PWM signal is clearly closed-loop controlled as a function of the detected currents $i_1$, $i_2$ and the motor voltage U and the setpoint rotational speed η.

For the implementation of the variable-frequency converter according to FIG. 1, a high-quality DSP 12 with sufficient computing power is necessary.

Figure 2:
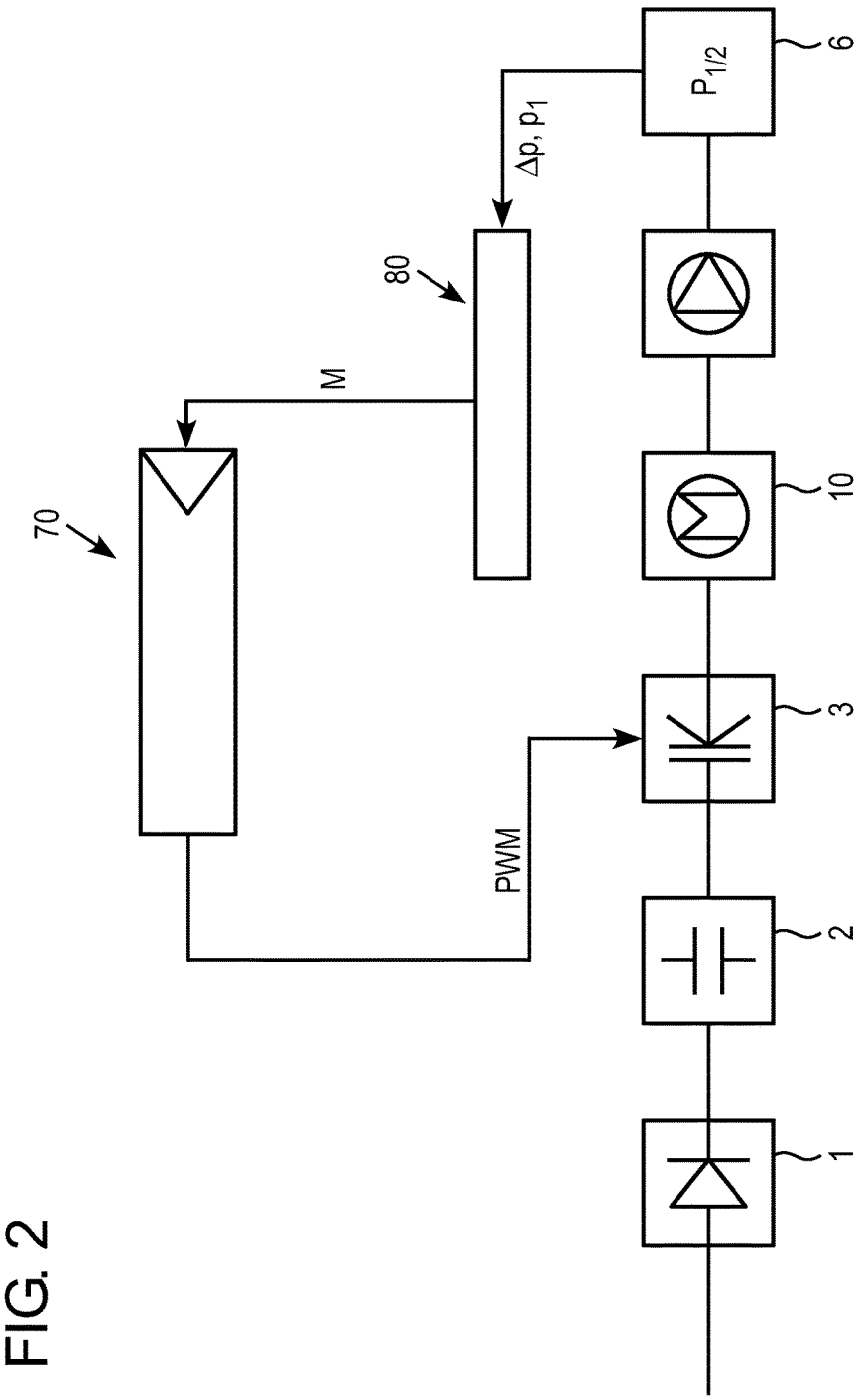
FIG. 2 shows a block diagram of the open-loop motor control system according to the invention for a synchronous reluctance motor for a pump.

FIG. 2 shows the method according to the invention for actuating a synchronous reluctance motor 10 for a pump. The same components of the FIGS. 1, 2 are provided with the same reference symbols. In the design according to the invention, the costly DSP 12 has been dispensed with, since the motor is controlled only in the volts/hertz operation. This means that the synchronous reluctance motor 10 is actuated only by the volts/hertz variable-frequency converter which is used. The determination of the rotor position is completely dispensed with in this operation. Consequently, the current measurement and the calculation of the motor model as shown in FIG. 1 are eliminated. The variable-frequency converter 70 receives a setpoint rotational speed η which is determined as a function of a measured differential pressure Δp and an individual pressure value $p_1$ in the block 80. On the basis of the setpoint rotational speed η, a PWM signal is generated according to a volts/hertz characteristic curve and used for the control of the synchronous reluctance machine 40.

The control method which is shown in FIG. 2 can be used, in particular, in centrifugal pumps, since they are considered in terms of drive technology to be well-behaved components with a low start-up torque and low dynamics, i.e. with only a small change in the torque within brief time periods. In addition, the ratio of the torque demand and rotational speed are subject to a quadratic relationship. This provides the possibility of defining the volts/hertz ratio of the converter 70 as a static-quadratic relationship, so that the overcoming of the start-up torque is ensured, but no energy-costly over-magnetization in the motor is caused at low rotational speeds.

Figure 3:
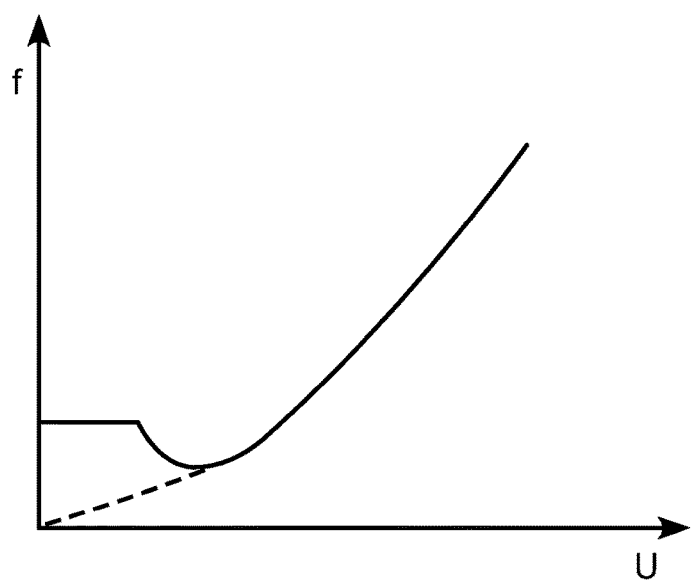
FIG. 3 shows a possible characteristic diagram for an open-loop volts/hertz control system for a synchronous reluctance motor for a pump according to the invention.

An example of the corresponding volts/hertz characteristic curve is shown in FIG. 3. The deviation from the quadratic relationship at low rotational speeds is referred to as the so-called boost process in order to permit a stable operation even at low rotational speeds.

As a rule, the converter in the centrifugal pump application does not serve to perform closed-loop control of the rotational speed as an end in itself but rather for the implementation of a closed-loop pressure control system. The pressure is measured by a pressure sensor 6 at the pressure connector or in the pressure line near to the pump or at the index circuit. In the improbable case of the rotor falling out of step as a result of fluctuation of the torque, for example as a result of dirt in the conveyor medium, the converter 70 detects the pressure drop and switches the motor 10 off briefly. In this case, the conveyor medium brakes the motor 10 strongly and brings it to a stationary state after a short time. After a short previously-defined time the re-start from the stationary state takes place. In particular in the heating/cooling applications, a brief interruption in operation owing to the relatively slow change in temperature is not critical.

The motor control system shown in FIG. 2 is preferably used in heating circulation pumps, service water circulation pumps or wet runners.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for controlling the motor of a synchronous reluctance motor for a pump having a variable-frequency converter, comprising the acts of:
controlling the synchronous reluctance motor using the variable-frequency converter in a volts/hertz operation, wherein
the variable-frequency converter operates in an open control circuit manner in which the variable-frequency converter does not use motor operating parameter feedback from the motor for closed-loop adjustment of motor operation,
a ratio of a voltage supplied to the synchronous reluctance motor to a frequency of the variable-frequency converter in the volts/hertz operation is predetermined based on the synchronous reluctance motor being controlled by the variable-frequency converter,
the variable-frequency converter in the volts/hertz operation controls a rotational speed of the motor,
the ratio of the voltage to the frequency varies with voltage in a static-quadratic relationship which includes in a fixed voltage-frequency relationship in a rotation speed range between zero speed and a predetermined low speed threshold, and a quadratic voltage-frequency relationship in a rotation speed range above the predetermined low speed threshold,
further comprising the acts of:
determining whether an anomaly state exists in which the at least one of the actual rotational speed of the motor and the process variable does not correspond to an expected state commanded by the variable-frequency converter in the volts/hertz operation, and
interrupting actuation of the synchronous reluctance motor by the variable-frequency converter in the volts/hertz operation for a predetermined period to reset control of the motor if the anomaly stated is determined to exist.

2. The method as claimed in claim 1, wherein the pump is centrifugal pump.

3. The method as claimed in claim 1, wherein in the act of controlling the synchronous reluctance motor using the variable-frequency converter in the volts/hertz operation, the variable-frequency converter controls the rotation speed to a setpoint rotational speed, and
the setpoint rotational speed is determined as a function of at least one of an actual rotational speed and a process variable that is indirectly controlled by the actual rotational speed.

4. The method as claimed in claim 1, wherein the process variable that is indirectly controlled by the rotational speed of the motor is a pressure of a media being pumped by the pump.

5. The method as claimed in claim 4, wherein the pressure is a differential pressure.

6. The method as claimed in claim 5, wherein the differential pressure is a differential pressure between a pump outlet pressure and a pump suction pressure.

7. The method as claimed in claim 5, wherein the pressure is measured at a pressure connector of the pump, a pressure line downstream of the pump outlet, or at an index circuit of a heating system.

8. A pump, comprising:
a synchronous reluctance motor;
a pump unit configured to be driven by the synchronous reluctance motor; and
a controller having a variable-frequency converter configured to control the motor,
wherein
the variable-frequency converter is a volts/hertz variable-frequency converter,
the variable-frequency converter is configured to operate in an open control circuit manner in which the variable-frequency converter does not use motor operating parameter feedback from the motor for closed-loop adjustment of motor operation,
a ratio of a voltage supplied to the synchronous reluctance motor to a frequency of the variable-frequency converter in the volts/hertz operation is predetermined based on the synchronous reluctance motor being controlled by the variable-frequency converter,
the variable-frequency converter in the volts/hertz operation is configured to control a rotational speed of the motor,
the ratio of the voltage to the frequency varies with voltage in a static-quadratic relationship which includes in a fixed voltage-frequency relationship in a rotation speed range between zero speed and a predetermined low speed threshold, and a quadratic voltage-frequency relationship in a rotation speed range above the predetermined low speed threshold,
the variable-frequency converter is configured to
determine whether an anomaly state exists in which the at least one of the actual rotational speed of the motor and the process variable does not correspond to an expected state commanded by the variable-frequency converter in the volts/hertz operation, and
interrupt actuation of the synchronous reluctance motor for a predetermined period to reset control of the motor if the anomaly stated is determined to exist.

9. The pump as claimed in claim 8, wherein the pump unit is a centrifugal pump.

10. The pump as claimed in claim 9, wherein the centrifugal pump is a heating circulation pump, service water circulation pump or wet runner.

11. A variable-frequency converter, comprising:
a variable-frequency converter in a volts/hertz operation, wherein
  the variable-frequency converter is configured to control a synchronous reluctance motor to drive a pump unit in accordance with a setpoint rotational speed,
  the variable-frequency converter is configured to operate in an open control circuit manner in which the variable-frequency converter does not use motor operating parameter feedback from the motor for closed-loop adjustment of motor operation,
  a ratio of a voltage supplied to the synchronous reluctance motor to a frequency of the variable-frequency converter in the volts/hertz operation is predetermined based on the synchronous reluctance motor being controlled by the variable-frequency converter,
  the variable-frequency converter in the volts/hertz operation is configured to control a rotational speed of the motor,
  the ratio of the voltage to the frequency varies with voltage in a static-quadratic relationship which includes in a fixed voltage-frequency relationship in a rotation speed range between zero speed and a predetermined low speed threshold, and a quadratic voltage-frequency relationship in a rotation speed range above the predetermined low speed threshold,
  the variable-frequency converter is configured to
    determine whether an anomaly state exists in which the at least one of the actual rotational speed of the motor and the process variable does not correspond to an expected state commanded by the variable-frequency converter in the volts/hertz operation, and
    interrupt actuation of the synchronous reluctance motor for a predetermined period to reset control of the motor if the anomaly stated is determined to exist.

12. The variable-frequency converter as claimed in claim 11, wherein
  the setpoint rotational speed is a function of at least one of a rotation speed and a process variable that is indirectly controlled by an actual rotational speed of the motor.

* * * * *